United States Patent
Kwak

(10) Patent No.: US 7,965,090 B2
(45) Date of Patent: Jun. 21, 2011

(54) METHOD FOR IDENTIFYING CONNECTED DEVICE AND ELECTRONIC DEVICE USING THE SAME

(75) Inventor: Dong Hoon Kwak, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 563 days.

(21) Appl. No.: 12/142,360

(22) Filed: Jun. 19, 2008

(65) Prior Publication Data

US 2009/0009187 A1  Jan. 8, 2009

(30) Foreign Application Priority Data

Jul. 4, 2007  (KR) .................. 10-2007-0066971

(51) Int. Cl.
*G01R 27/08*  (2006.01)

(52) U.S. Cl. ..................................................... 324/713
(58) Field of Classification Search .................. 324/713
See application file for complete search history.

(56) References Cited

U.S. PATENT DOCUMENTS

| | | | |
|---|---|---|---|
| 6,948,000 B2* | 9/2005 | Desai et al. | 709/245 |
| 7,072,360 B2* | 7/2006 | Dravida et al. | 370/468 |
| 7,231,540 B2* | 6/2007 | Morimoto et al. | 714/4 |
| 2002/0124111 A1* | 9/2002 | Desai et al. | 709/246 |

* cited by examiner

*Primary Examiner* — Thomas Valone
(74) *Attorney, Agent, or Firm* — Jefferson IP Law, LLP

(57) ABSTRACT

A method for identifying connected devices and an electronic device using the method are disclosed. When the connected device is connected to the electronic device, a type of the connected device is identified based on the voltage change according to a change of current flowing in therebetween, and then a corresponding function is performed based on the identified type.

20 Claims, 5 Drawing Sheets

METHOD FOR IDENTIFYING CONNECTED DEVICE AND ELECTRONIC DEVICE USING THE SAME

PRIORITY

This application claims the benefit under 35 U.S.C. §119(a) of a Korean patent application filed in the Korean Intellectual Property Office on Jul. 4, 2007 and assigned Serial No. 2007-0066971, the entire disclosure of which is hereby incorporated by reference.

BACKGROUND OF THE INVENTION

1. Field of the Invention

The present invention relates to an electronic system. More particularly, the present invention relates to an apparatus and method for identifying connected devices that controls current flowing in a path where a connected device is connected to an electronic device, monitors a time point when the voltage is changed, and determines a type of connected device, based on the time point when the voltage is changed.

2. Description of the Related Art

Previously, electronic devices, i.e., portable electronic devices, only provided a voice call service. As technology has progressed, electronic terminals, which can be easily carried and store a variety of programs, have advanced to provide additional features so that they can be widely used in various fields. Accordingly, the number of users and service subscribers of mobile communication terminals, which now provide advanced features in addition to a voice call service, has rapidly increased.

Conventional electronic devices are large and heavy in order to stabilize a battery and other electronic parts. In recent years, as electronic parts and batteries have become more advanced, these electronic devices have been reduced in size, weight and thickness.

Electronic devices have a 24-pin connector that is connected to a cable for supporting a recharging mode and a communication mode. In the recharging mode, a battery is recharged and in the communication mode, data is communicated by the device. The 24-pin connector is configured to meet a corresponding use. The 24-pin connecter arranges its pins according to preset functions of the electronic devices, such as recharging mode and communication mode, so that it can be used in two modes. As electronic devices have recently become smaller and slimmer, connectors have also been reduced in both size and number of pins. In other words, electronic devices need to reduce the number of pins in the connector in order to reduce their size. Therefore, the electronic devices must support a variety of modes using the same number of pins as the connector. For example, when the connector is configured to have 4 pins, it must be used for the electronic devices in order to support the recharging mode for battery recharging and the communication mode for data communication. However, the current flowing between an electronic device and a re-charger during the recharging mode is different from a current flowing between the electronic device and a terminal during the communication mode. Therefore, the conventional electronic device must detect which type of device, such as a communication terminal or a re-charger, is connected to the connector.

SUMMARY OF THE INVENTION

An aspect of the present invention is to address the above-mentioned problems and/or disadvantages and to provide at least the advantages described below. Accordingly, an aspect of the present invention is to provide an apparatus and method for identifying a type of device connected to an electronic device using current and voltage between the connected device and the electronic device and for performing a corresponding function according to the identified type of connected device.

In accordance with an aspect of the present invention, a method for identifying a connected device is provided. The method includes determining whether a connected device is connected to an electronic device, detecting, when a connected device is connected to an electronic device, a voltage change according to the change of current flowing between the connected device and the electronic device, and identifying a type of the connected device based on the detection result.

In accordance with another aspect of the present invention, a method for identifying a connected device is provided. The method includes determining whether a connected device is connected to an electronic device, checking a time point of a voltage change according to the change of current flowing between the connected device and the electronic device, according to whether a connected device is connected to an electronic device, detecting a current value at the time point when the voltage is changed, comparing the detected current value with a second reference data, and identifying a type of connected device based on the comparison result.

In accordance with another aspect of the present invention, an electronic device for identifying a connected device is provided. The device includes an interface connected to a connected device, a connected device identifying unit for detecting a voltage change according to the change of current flowing between the electronic device and the connected device that is connected to the electronic device, and for identifying a type of connected device, based on the detection result, and a controller for controlling the interface and the connected device identifying unit and for performing functions according to the identified type of the connected device.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
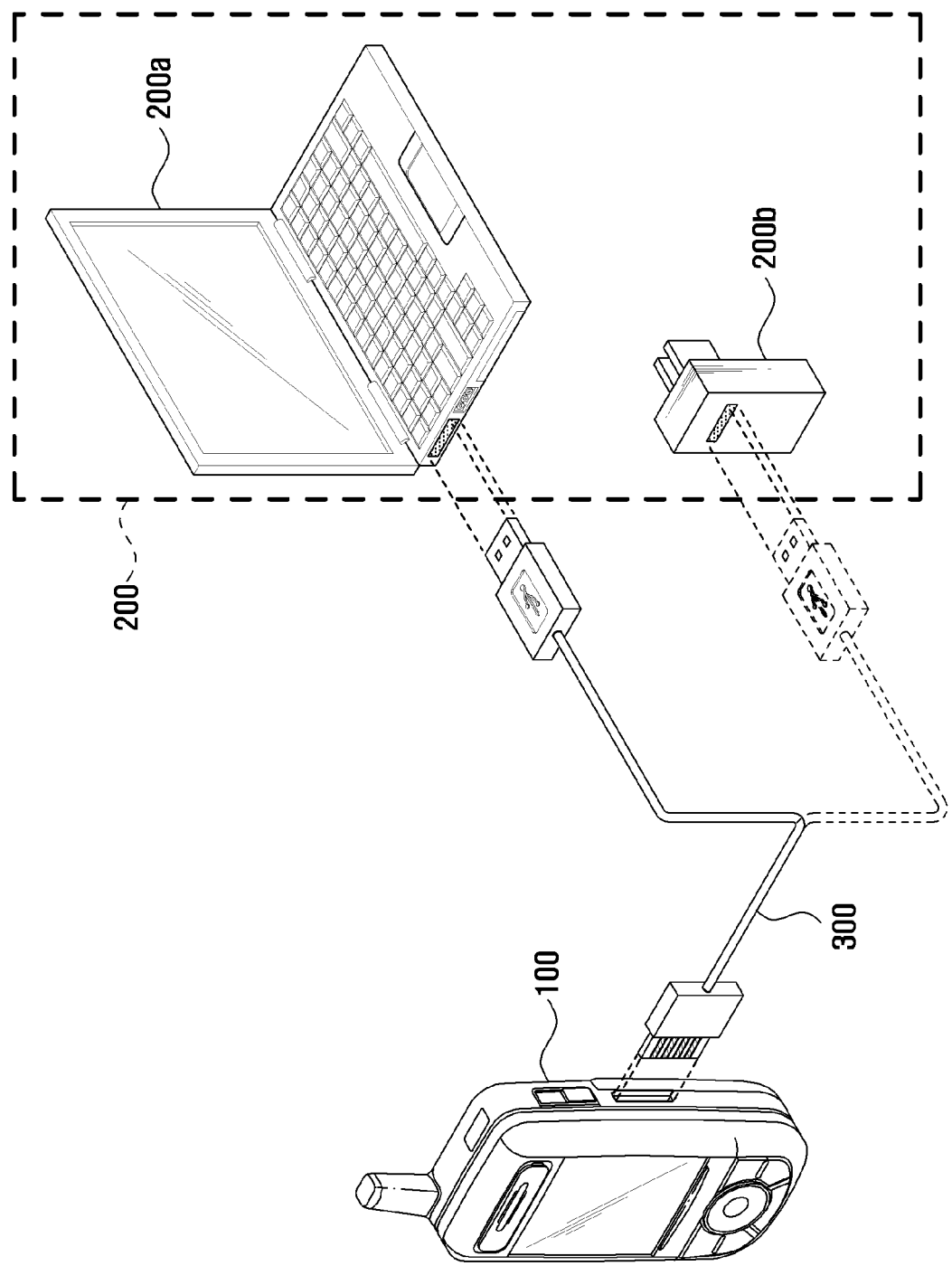
FIG. 1 is a schematic configuration illustrating a system for identifying connected devices, which includes a connected device and an electronic device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms or words used in the present description and the claims should not be limited by a general or lexical meaning, instead they should be analyzed as having a meaning and a concept through which the inventor endeavors to define and describe the present invention. Therefore, one skilled in the art will understand that the embodiments disclosed in the description and configurations illustrated in the drawings are only exemplary, and that there may be various modifications, alterations, and equivalents thereof to replace the exemplary embodiments at the time of filing this application.

For example, in the following description a device connected to an electronic device is described as a re-charger or a laptop computer. However, this is not to be constructed as limiting. Such a connected device, adapted to a connected device identifying method according to an exemplary embodiment of the present invention, may be other electronic devices, such as PDAs, desktop computers, game devices, laptop computers and the like. A connected device, according to an exemplary embodiment of the present invention, refers to devices that are connected to an electronic device and supply power to the electronic device or perform communication with the electronic device. The connected device identifying method, according to an exemplary embodiment of the present invention, can be applied to any other devices that are connected to an electronic device, where current flowing between the connected device and electronic device is changed and accordingly voltage change occurs.

Although the electronic device according to an exemplary embodiment of the present invention refers to a device that can be connected to a connected device, such as a re-charger, a laptop computer and the like, it will be appreciated that the electronic device can be applied to all the information communication devices, multimedia devices, and their applications, such as, mobile communication terminal, digital broadcasting terminal, Personal Digital Assistant (PDA) terminal, smart phone, 3G terminal, such as International Mobile Telecommunication 2000 (IMT-2000) terminal, Wideband Code Division Multiple Access (WCDMA) terminal, Universal Mobile Telecommunication Service (UMTS) terminal and the like.

FIG. 1 is a schematic configuration illustrating a system for identifying a connected device, which includes a connected device and an electronic device, according to an exemplary embodiment of the present invention.

As shown in FIG. 1, the system includes an electronic device 100, a connected device 200, and a cable 300 for connecting the electronic device 100 and the connected device 200. The cable 300 can be implemented in such a manner that it is integrally included in the connected device 200.

The system for identifying a connected device is operated in such manner to monitor a change of signals between the electronic device 100 and the connected device 200. The system is monitored when the electronic device 100 is connected to the device 200 to match the monitored value with a connected device that generates a signal change at a particular time point, thereby identifying a type of connected device 200 currently connected to the electronic device 100. More specifically, when the electronic device 100 is connected to the device 200, the system controls the initial current value flowing between the electronic device 100 and the connected device 200 to be, for example, 100 mA. After that, the system increases the current value by an increment, for example, 100 mA. That is, the system can control to linearly increase current between the electronic device 100 and connected device 200 at a certain value of current. The system can also control to linearly increase the current value by an increment, for example, 100 mA, 200 mA, 300 mA, . . . , etc. At the same time, the system monitors the voltage change corresponding to the change of current and detects a time point when the voltage value is changed. When detecting the voltage change, the system identifies the type of the connected device 200. For example, the connected device 200 may correspond to a laptop computer 200a or a re-charger 200b based on a time point when the voltage value is changed. In an exemplary implementation, when the laptop computer 200a is connected to the electronic device 100, it is set to flow a current of, for example, 300 mA. In addition, when the re-charger 200b is connected to the electronic device, it is set to flow a current of, for example, 500~550 mA. Therefore, when a current change occurs over a preset current value, the voltage value is also changed. Using this principle, the system of an exemplary embodiment of the present invention can identify the type of the connected device 200. The electronic device 100 according to an exemplary embodiment of the present invention is described in more detail as follows, with reference to FIG. 2.

Figure 2:
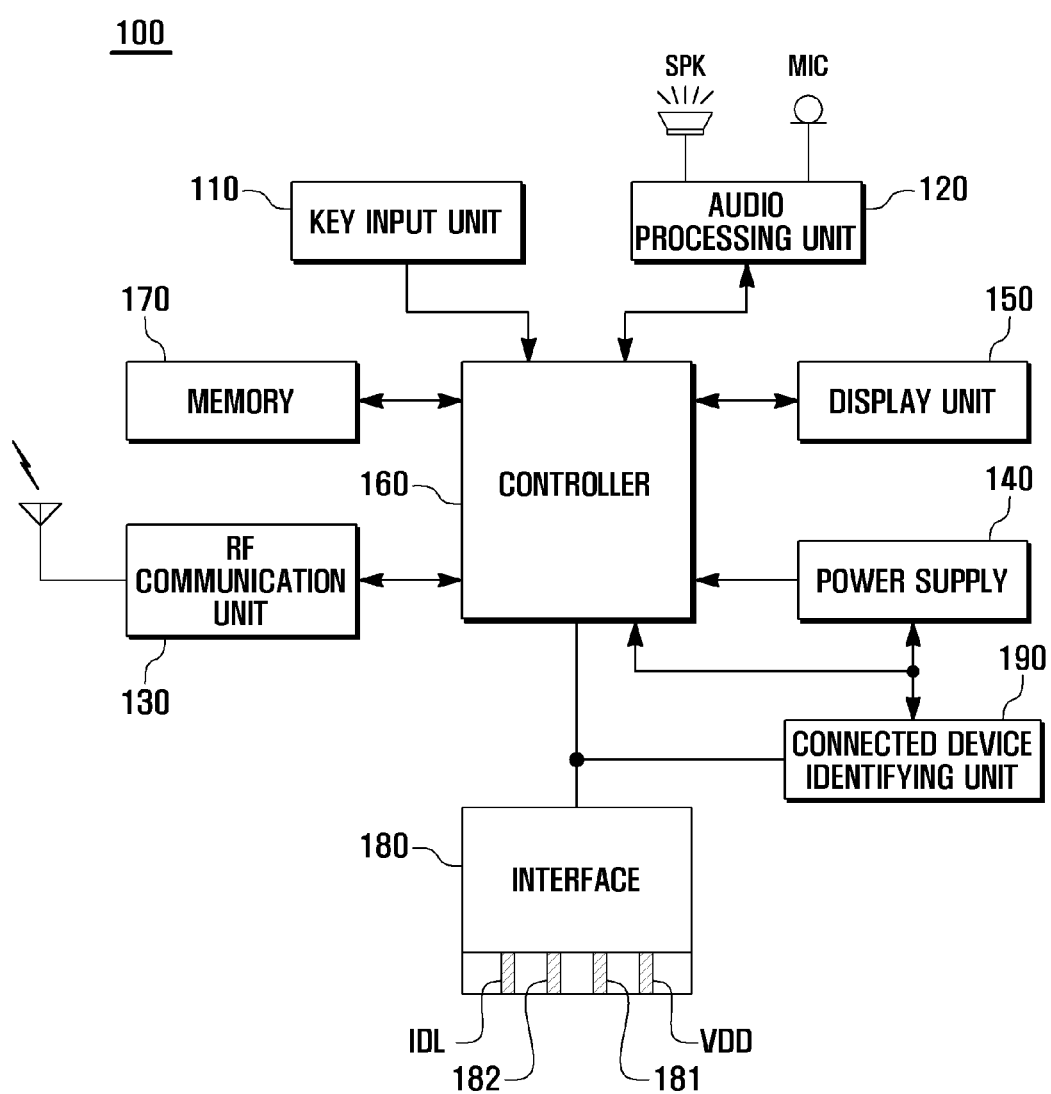
FIG. 2 is a schematic block diagram illustrating an electronic device according to an exemplary embodiment of the present invention.

FIG. 2 is a schematic block diagram illustrating an electronic device according to an exemplary embodiment of the present invention.

As shown in FIG. 2, the electronic device 100 includes a power supply unit 140, an interface 180, a connected device identifying unit 190, a memory 170, and a controller 160.

The power supply unit 140 supplies power to the elements of the electronic device 100. The power supply unit 140 is recharged by the re-charger 200b of the connected device 200.

The interface 180 includes first and second signal lines 181 and 182 for transmitting and receiving signals to and from the connected device 200, a power line (VDD) for supplying power, and an ID line (IDL) for receiving a particular identification signal of a connected device. The interface 180 can transmit data using the difference between the signals that are transmitted through the first and second signal lines 181 and 182. The first signal line 181 transmits a signal when the voltage falls below a certain voltage level. The second signal line 182 transmits a signal when the voltage rises above the ground voltage level. For example, the first signal line 181 transmits a signal while the signal level repeatedly falls and rises between 3 V and 1.5 V. The second signal line 182 transmits a signal while the signal level repeatedly rises and falls between the ground voltage and 1.5 V. The interface 180 further includes a power storage unit (not shown) for storing pull-up power which serves to notify the connected device 200 that the electronic device 100 is connected to the connected device 200 when the first signal line 181 is connected to the connected device 200. The power storage unit maintains power in a pull up state and supplies the pull up power to the connected device 200 when the connected device 200 is connected to the power storage unit. The connected device 200 recognizes that the electronic device 100 is connected thereto and then transmits signals for corresponding functions to the first and second signal lines 181 and 182. The pull up power can serve to maintain a certain level of voltage, for example, 3.0~3.3 V. The pull up power can vary depending on a type of terminal. When the connected device 200 is a re-charger 200b, the power line VDD serves to supply recharging power thereto. When the connected device 200 is a terminal, such as a laptop computer 200a, the power line VDD serves to supply a Universal Serial Bus (USB) power thereto. The interface 180 serves as a connector port, a USB port, and the like.

The connected device identifying unit 190 identifies which type of a device 200 is connected to the interface 180 and then outputs the identified result to the controller 160. When the connected device is a re-charger, the connected device identifying unit 190 may include a recharging circuit for supplying recharging power to the power supply unit 140. The connected device identifying unit 190, as described in FIG. 3, includes a recharging circuit 191, a variable resistor 193, a voltage detector 195, a resister adjusting unit 199, and a device identifying unit 197. The recharging circuit 191 is connected to at least one of the signal lines of the interface 180. The variable resistor 193 is connected to the recharging circuit 191 and to the resister adjusting unit 199. The voltage detector 195 is connected to at least one of the signal lines of interface 180 and is aligned in parallel to the recharging circuit 191. The device identifying unit 197 is connected between the voltage detector 195 and the resister adjusting unit 199.

The recharging circuit 191 is connected to a particular signal line of the interface 180, for example, or a power line VDD. The recharging circuit 191 outputs a signal, received through the particular signal line or power line, to the power supply unit 140 or to the device identifying unit 197 through the variable resistor 193 and the resister adjusting unit 199. When recharging power is input through the power line VDD, the recharging circuit 191 recharges the power supply unit 140. In an exemplary implementation, the recharging circuit 191 is configured to serve as a current mirror circuit so that the signals, input through the interface 180, can be output to the power supply unit 140 and the voltage detector 195, respectively and independently. In this case, the current mirror circuit is configured to form two independent paths as follows. A first path is established by the power line VDD, the recharging circuit 191, and the power supply unit 140. A second path is established by the power line VDD, the recharging circuit 191, the variable resistor 193, the resister adjusting unit 199, the device identifying unit 197, and the voltage detector 195.

The variable resistor 193 is located between the recharging circuit 191 and the resister adjusting unit 199. The variable resistor 193 varies its resistance to control the current flowing in the second path. The resistance of the variable resistor 193 is varied by the resister adjusting unit 199.

The voltage detector 195 monitors the voltage of a particular signal as power line of the interface 180 and outputs the monitored result to the device identifying unit 197. In an exemplary implementation, the voltage detector 195 detects the voltage of the power line VDD. When the resistance of the variable resistor 193 is changed and current flowing in the second path is accordingly changed, the voltage detector 195 detects the time point when the voltage is changed. After that, the voltage detector 195 outputs the time point when the voltage is changed or the current value at the time point when the voltage is changed to the device identifying unit 197. The above process is described in detail below, with reference to FIG. 4.

Figure 4:
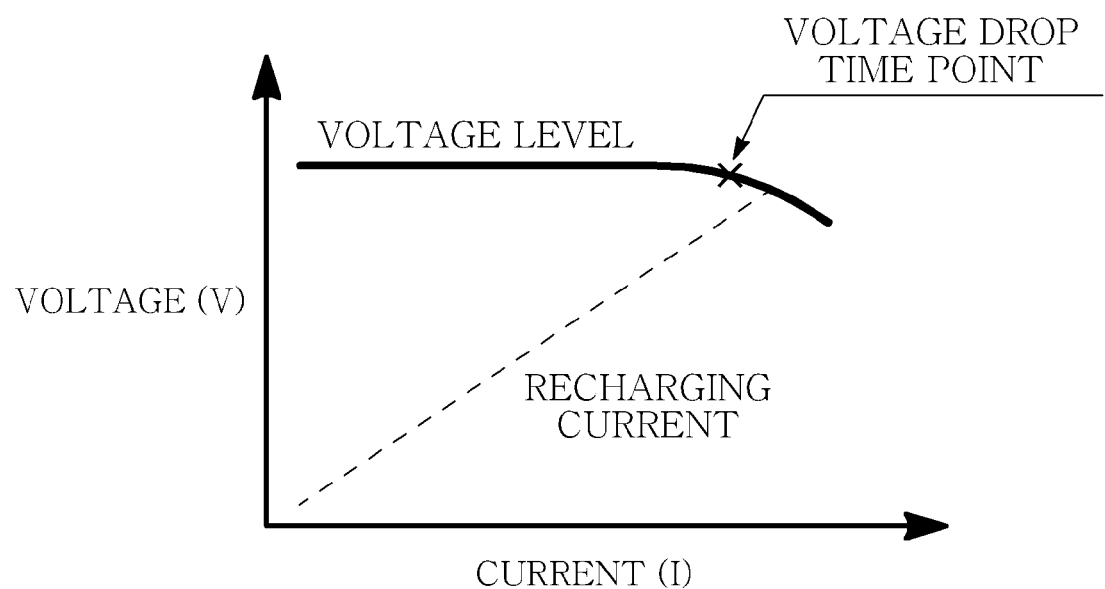
FIG. 4 is a graph illustrating an I-V curve according to an exemplary embodiment of the present invention.

FIG. 4 is a graph illustrating an I-V curve according to an exemplary embodiment of the present invention. The curve illustrates the relationship between current and voltage where the voltage maintains a certain level while the recharging current is increasing constantly and then drops at a particular time point according to the feature of a connected device 200.

The voltage detector 195 monitors and detects a time point when a voltage change occurs according to the linear increase of the recharging current and then outputs the detected value to the device identifying unit 197. Since the power supply unit 140 exists in the path, the voltage detector 195 can also check the voltage of the power supply unit 140 to detect a voltage change.

The device identifying unit 197 identifies a type of connected device 200 according to data that is based on the time point of the voltage change or the current value at the time point when the voltage change occurs, which are output from the voltage detector 195. In an exemplary implementation, the device identifying unit 197 has previously obtained the data for a time point when the voltage change occurs or the data for a current value at a time point when the voltage change occurs. The data for the current value is temporarily stored in a buffer and then provided to the device identifying unit 197. Also, the data for the current value is stored in the memory 170 and then provided to the device identifying unit 197, according to the control of the controller 160, when the connected device 200 is connected thereto. For example, when a voltage change corresponding to 300 mA has occurred, the device identifying unit 197 concludes that a currently connected device 200 is a terminal, such as a laptop computer 200a. When a voltage change corresponding to 500 mA has occurred, the device identifying unit 197 concludes that a re-charger 200b is currently connected thereto. Since a time point when a voltage change occurs may be different according to a feature of the connected device 200, the device identifying unit 197 can determine the type of the connected device with respect to a range of time interval for the time point when the voltage change occurs. In addition, the device identifying unit 197 may determine the type of a particular connected device 200 by calculating an average of current values corresponding to time points near the time point when the voltage change has occurred and then comparing the calculated average with the current value of the particular connected device 200.

The resister adjusting unit 199 varies the resistance of the variable resistor 193 through the device identifying unit 197 or the controller 160. The resister adjusting unit 199 adjusts the variable resistor 193 so that current flowing in the path can be varied. The resister adjusting unit 199 can be integrally formed with the device identifying unit 197, so that the device identifying unit 197 can directly control the variable resistor 193. Also, the resister adjusting unit 199 and the device identifying unit 197 can be integrally formed with the controller 160, so that the controller 160 can serve as the resister adjusting unit 199 and the device identifying unit 197.

The present exemplary embodiment is implemented in such a manner that the connected device identifying unit 190 includes the variable resistor 193 and the resister adjusting unit 199, however, it should be understood that the present invention is not limited by the exemplary embodiment. For example, the recharging circuit 191 may be implemented by a digital chip. In that case, the variable resistor 193 and the resister adjusting unit 199 are not needed, because the recharging circuit 191, implemented by a digital chip, can serve as the variable resistor 193 and the resister adjusting unit 199 according to the control of the controller 160. It should be understood that the connected device identifying unit of an exemplary embodiment of the present invention can determine a type of the connected device 200 based on the voltage change according to the change of current flowing between the connected device 200 and the electronic device 100.

Referring back to FIG. 2, the memory 170 stores an application program for operations of the electronic device 100 and information about a connected device, associated with a time point when the voltage change occurs. When the electronic device 100 is a mobile communication terminal, the memory 170 temporarily or semi-permanently stores user data, etc. generated as the electronic device 100 performs a variety of functions. Also, the memory 170 serves as a buffer for buffering signals transmitted or received through an RF communication unit 130. The memory 170 may be configured to include a program area and a data area.

The program area stores an Operating System (OS) for booting the electronic device 100, an application program for reproducing multimedia contents when the electronic device is a mobile communication terminal and other terminals that provides other functions. And the program area stores other application programs that are necessary for other optional functions of the electronic device 100, such as a camera function, audio reproduction function, and image or moving image reproduction function, and the like. When a user requests one of the functions listed above, the controller 160 activates a corresponding application so that the electronic device 100 can provide the function to the user. When the connected device 200 is connected to the electronic device 100, the program area can store an application program associated with therebetween. That is, the program area can store an application program that is activated only if the electronic device 100 is connected to the connected device 200.

The data area stores data generated as the electronic device 100 is used. The data area stores user data related to a variety of optional functions, as described above, such as images or moving images captured by the camera, phonebook data, audio data, corresponding contents, or information about user data, and the like. Also, the data area stores reference data for the connected device 200 that can be connected to the electronic device 100. The reference data corresponds to a time point when the voltage change occurs according to the change of current, which is detected by the electronic device 100 when the connected device 200 is connected to the electronic device 100. When the connected device 200 is connected to the electronic device 100, the reference data can be output to the connected device identifying unit 190 or the controller 160.

The controller 160 controls the entire operations of the electronic device 100 and signal flows between blocks in the electronic device 100. When the electronic device 100 is a mobile communication terminal, the controller 160 may include functions of a modem and a codec. The controller 160 inputs the result of the connected device identifying unit 190 and processes signals that are transmitted to and received from the connected device 200. That is, the controller 160 can control the interface 180 so that current of greater than 300 mA, for example, cannot flow in through the interface 180, upon concluding that the connected device 200 is a laptop computer 200a. In contrast, when the controller 160 concludes that the connected device 200 is a re-charger, it can control the interface 180 so that current of about 550 mA, for example, can flow in through the interface 180. The controller 160 may be configured to include the connected device identifying unit 190.

When the electronic device 100 according to an exemplary embodiment of the present invention is applied to a mobile communication terminal, it may further include an RF communication unit 130, a key input unit 110, an audio processing unit 120, a display unit 150, and the like.

When the electronic device 100 is applied to a communication terminal, the RF communication unit 130 establishes a communication channel with a network, so that it can transmit and receive voice signals and data to and from the network. To this end, the RF communication unit 130 is configured to include an RF transmitter (not shown) for up-converting the frequency of transmitted signals and for amplifying the transmitted signals, and an RF receiver (not shown) for low-noise amplifying of received RF signals and for down-converting the frequency of the received RF signals. When the connected device 200 is a communication module, such as a portable modem, it can take the place of the RF communication unit 130.

The key input unit 110 serves to input numbers or letters. The key input unit 110 includes a plurality of input keys and function keys through which a variety of functions can be set. The function keys include direction keys, side keys, shortcut keys, etc., which perform particular functions. The key input unit 110 outputs key signals, related to user setting and functional controls of the electronic device 100, to the controller 160. In particular, after the connected device 200 is connected to the electronic device, the key input unit 110 creates key signals to control the connected device 200 and outputs them to the controller 160.

The audio processing unit 120 reproduces audio signals outputted from the RF communication unit 130 through a speaker (SPK). In addition, the audio processing unit 120 collects and outputs audio signals, input through a microphone (MIC), to the controller 160. When the connected device 200 is connected to the electronic device 100, the audio processing unit 120 may generate and output a signal to a speaker (SPK) notifying that the connected device 200 is connected thereto. The audio processing unit 120 may output a digital audio signal to the control unit 160 by converting an audio signal received from an MIC to a digital audio signal. The connected device 200 can take the place of the audio processing unit 120. That is, when the connected device 200 is an individual audio device, the audio device is connected to the electronic device 100, reproduces or collects the audio signals, and transmits them to the controller 160.

The display unit 150 displays a variety of menus for the electronic device 100, information input by a user, and information to be provided to the user. When the electronic device 100 activates one of the terminal functions, such as a call function, the display unit 150 displays an image related to a call channel that is established according to an input key signal. In particular, when the connected device 200 is connected to the electronic device through the interface 180, the display unit 150 can display an image corresponding to a type of the connected device 200. For example, when the connected device 200 is a laptop computer, the display unit 150 can display a laptop computer image. When the connected device 200 is a re-charger, the display unit 150 can display a re-charger image or an image or text indicative of a recharging state. The display unit 150 can be implemented by a Liquid Crystal Display (LCD) or a touch screen and the like. In particular, when the display unit 150 is implemented by a touch screen, it serves as a key input unit.

Figure 3:
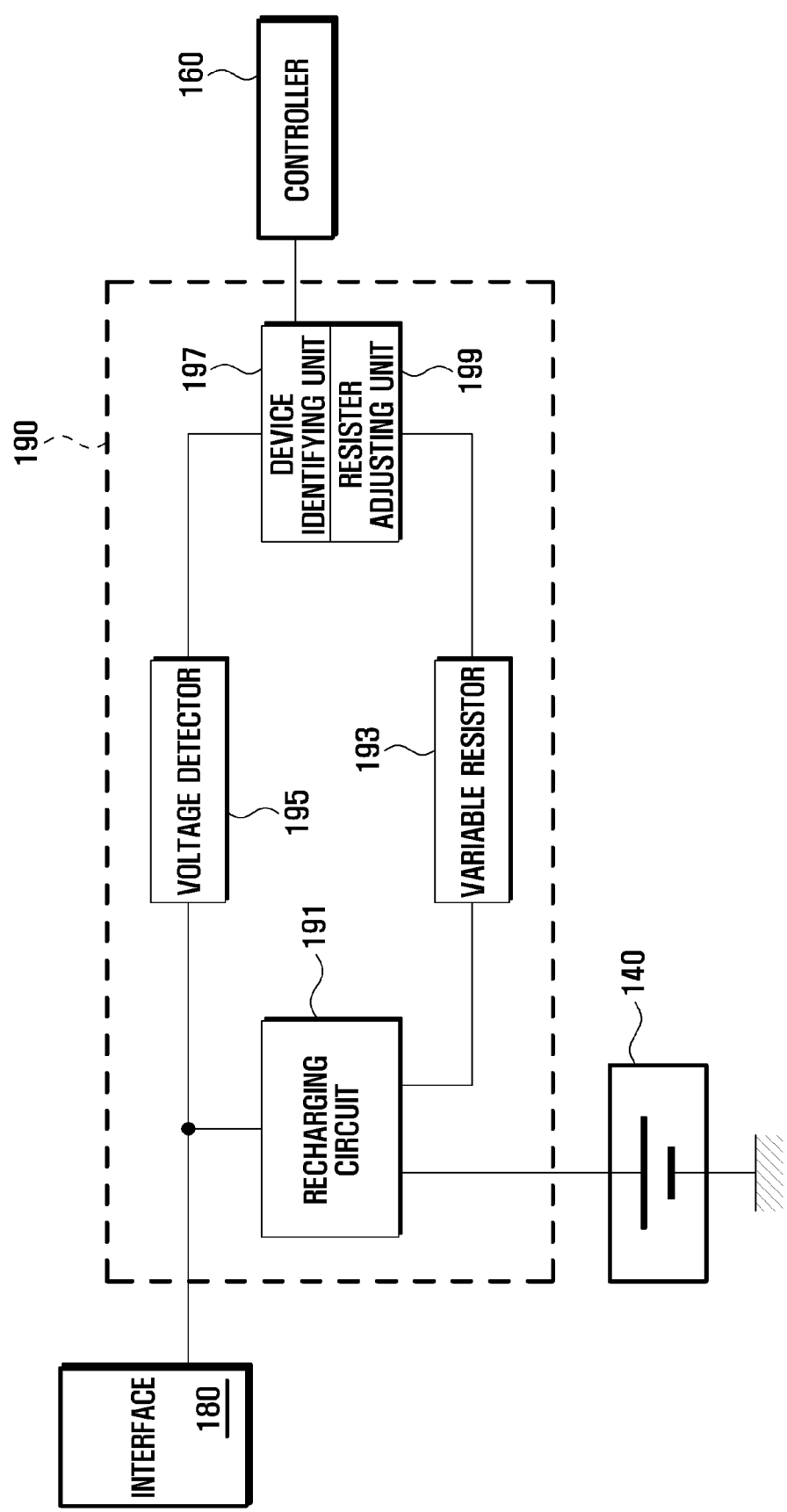
FIG. 3 is a schematic block diagram illustrating a connected device identifying unit according to an exemplary embodiment of the present invention.

FIGS. 1 to 3 illustrate the blocks to describe operations of an exemplary embodiment of the present invention. However, it should be understood that the present invention is not limited by such a configuration. The electronic device 100 of an exemplary embodiment of the present invention may further include a digital broadcasting module, a multimedia module, and the like, according to the required demands.

As described above, the system for identifying a connected device, according to an exemplary embodiment of the present invention, detects signals communicated between the electronic device 100 and the connected device 20, identifies a type of the connected device 200 based on a time point when the voltage change occurs. And then the system activates a function corresponding to the identified type of connected device 200.

A method for identifying connected devices, according to an exemplary embodiment of the present invention, is described in detail below with reference to FIG. 5.

Figure 5:
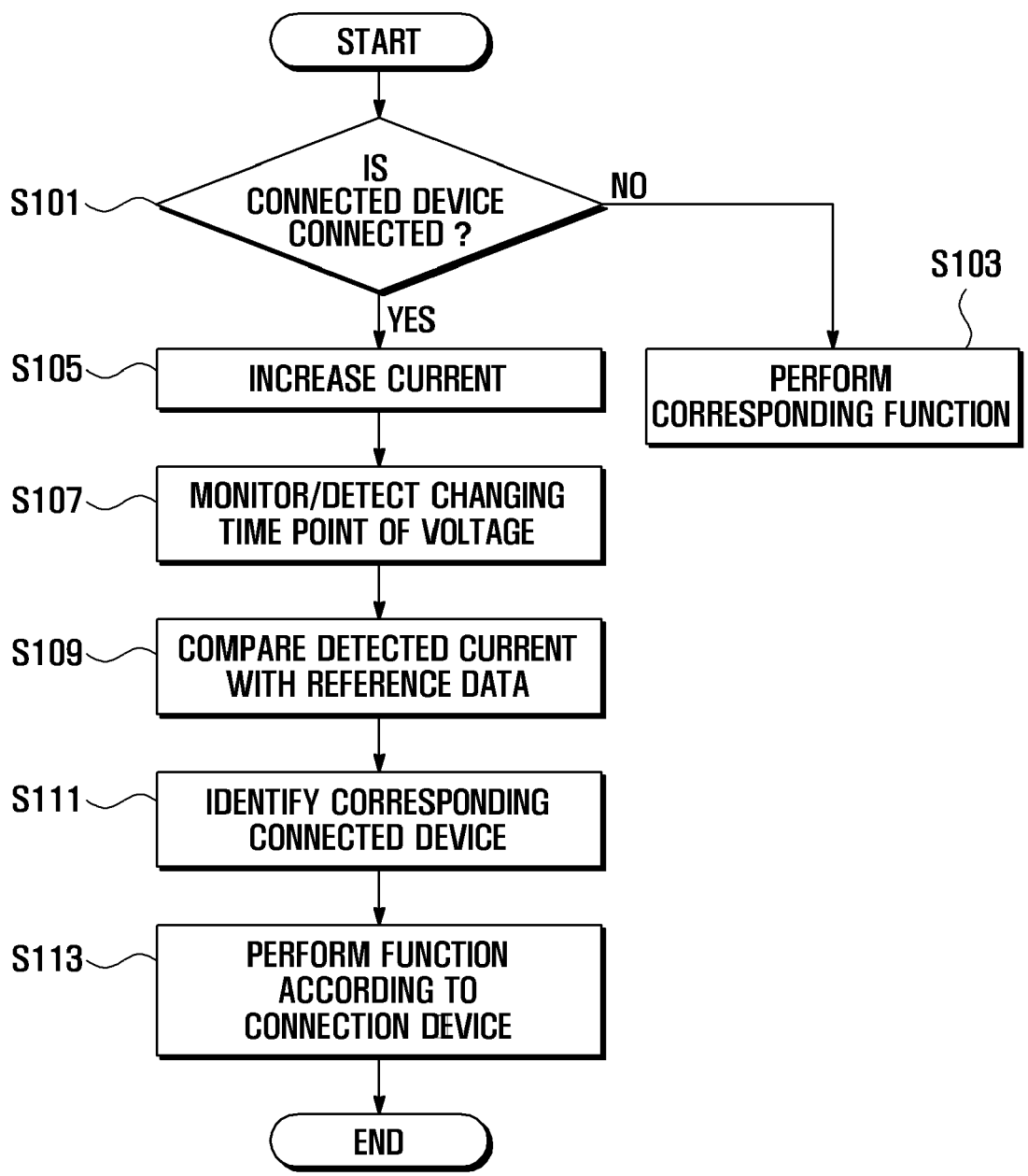
FIG. 5 is a flowchart describing a method for identifying a connected device according to an exemplary embodiment of the present invention.

FIG. 5 is a flowchart describing a method for identifying connected devices according to an exemplary embodiment of the present invention.

Referring to FIG. 5, the controller 160 determines whether a device 200 is connected to the electronic device 100 at step S101. When the connected device 200 is connected to the interface 180 of the electronic device 100, the electronic device 100 supplies pull up power to the connected device 200 and the connected device 200 transmits a signal corresponding to the received pull up power to the electronic device 100. Therefore, the electronic device 100 recognizes the connection of the connected device 200.

The controller 160 gradually increases a current of the signals, transmitted between the connected device and the electronic device, from the initial current value at step S105. For example, when current of 100 mA initially flows between the connected device 200 and the electronic device 100, the controller 160 can linearly increase the current value by increments of 100 mA. That is, the connected device identifying unit 190 controls the resister adjusting unit 190 and the variable resistor 193 according to the control of the controller 160, so that the current increase process can be achieved according to the controller's directions.

The controller 160 monitors a time point when the voltage change occurs and detects a current value at the time point when the voltage change has occurred at step S107. Although the connected device 200 is connected to the electronic device 100 and the current value is then increased, the voltage between the electronic device 100 and connected device 200 is constantly maintained for a certain period of time. When the current value exceeds a certain value set by the connected device 200, the voltage value drops. Therefore, the controller 160 detects a time point when the voltage drop occurs or the current value at the time point when the voltage drop has occurred.

When the current value is detected at a time point when the voltage change has occurred at step S107, the controller 160 searches for a value that matches the current value at the time point when the detected voltage changes or at the time point when the voltage change occurs at step S109. To this end, the controller 160 retrieves a reference data, matched with the current value and the time point when the voltage change occurs, from the memory 170 or a buffer, and then performs a comparing process. The reference data corresponds to the time point of the voltage change or the current value data according to the connected device 200. The time point of the voltage change and the current value is described in the manual of the connected device 200 or can be experimentally obtained.

The controller 160 compares the detected current value with the reference data and then identifies a type of the connected device 200 currently connected to the electronic device at step S111. In an exemplary implementation, the controller may set an error range to make a comparison between the current value and the reference data, allowing for the current measurement error and the inherent feature of the connected device 200.

After identifying the type of the connected device 200 at step S111, the controller 160 performs a corresponding function according to the identified type of the connected device at step S113. When the connected device 200 is a laptop computer, the controller 160 performs a setting operation for establishing a serial communication channel between the electronic device 100 and the laptop computer. When the connected device 200 is a re-charger, the controller 160 interrupts data transmitting and receiving operations but instead supplies power from the re-charger to the power supply unit 140 through the recharging circuit, so that the power supply unit 140 can be recharged.

In contrast, when the connected device 200 is not connected to the electronic device 100 at step S101, the controller 160 performs corresponding functions, such as a camera function, an MP3 player function, voice/data communication function, a file playback function and the like, which are provided by the electronic device 100 at step S103.

As described above, the method for identifying connected devices and the electronic device using the method, according to exemplary embodiments of the present invention, varies current flowing in between an electronic device and a connected device currently connected to the electronic device and identifies a type of the connected device, with respect to a time point when the voltage change occurs and the current value at the time point when the voltage change has occurred.

In the foregoing, the method for identifying connected devices and the electronic device using the method, according to exemplary embodiments of the present invention, can identify a type of a connected device based on the voltage change according to a current change when the connected device is connected to the electronic device. And the method performs a corresponding function based on the identified type, thereby protecting the device and providing corresponding services to a user.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims and their equivalents.

What is claimed is:

1. A method for identifying connected devices, the method comprising:
   determining whether a device is connected to an electronic device;
   detecting, when the device is connected to the electronic device, a voltage change corresponding to a change of current flowing between the connected device and the electronic device; and
   identifying a type of the connected device based on the detection result.

2. The method of claim 1, further comprising:
   establishing a first current path between a power supply of the connected device, a power line connected to the connected device, a recharging circuit connected to the power line, and a power supply unit connected to the recharging circuit; and
   establishing a second current path between the recharging circuit, a voltage detecting unit connected to the recharging circuit, a variable resistor connected to the recharging circuit in parallel with the voltage detecting unit, and a device identifying unit connected between the voltage detecting unit and the variable resistor.

3. The method of claim 2, wherein the detecting of the voltage change comprises:
   varying current in the second current path; and
   detecting the voltage change of the power supply when the current is changed.

4. The method of claim 3, wherein the varying of the current comprises:
   changing a resistance of the variable resistor; and
   changing current flowing in the current path.

5. The method of claim 3, wherein the varying of the current comprises linearly increasing the current.

6. The method of claim 4, wherein the detecting of the voltage change comprises detecting a time point when the voltage drops according to an increment of current.

7. The method of claim 5, wherein the detecting of the voltage change comprises detecting a time point when the voltage drops according to an increment of current.

8. The method of claim 6, wherein the identifying of the type of the connected device comprises comparing voltage, at a time point when the voltage is reduced according to an increment of current, with a reference data.

9. The method of claim 2, further comprising:
   performing a corresponding function according to the identified type of connected device,
   wherein, when the connected device is a re-charger, power is supplied from the connected device to the power supply unit through the recharging circuit.

10. A method for identifying connected devices comprising:
    determining whether a device is connected to an electronic device;
    checking a time point of a voltage change according to the change of current flowing between the connected device and the electronic device, according to whether a connected device is connected to an electronic device;
    detecting a current value at the time point when the voltage is changed;
    comparing the detected current value with a second reference data; and
    identifying a type of connected device based on the comparison result.

11. The method of claim 10, wherein the determining of whether the device is connected to the electronic device comprises:
    varying the current flowing between the connected device and the electronic device; and
    detecting the voltage change when the current is changed.

12. The method of claim 11, wherein the varying of the current comprises changing a resistance of a variable resistor.

13. An electronic device comprising:
    an interface for connecting to a device;
    a connected device identifying unit for detecting a voltage change according to a change of current flowing between the electronic device and the device that is connected to the electronic device, and for identifying a type of the device, based on the detection result; and
    a controller for controlling the interface and the connected device identifying unit and for performing functions according to the identified type of device.

14. The electronic device of claim 13, wherein the interface comprises:
    a high voltage line for providing high voltage power;
    an ID line for transmitting an identification signal of the device; and
    first and second signal lines for transmitting and receiving signals to and from the device.

15. The electronic device of claim 14, wherein the connected device identifying unit detects a time point of a voltage change according to a current change in the power that flows therein through the high voltage line.

16. The electronic device of claim 15, wherein the connected device identifying unit comprises:
    a recharging circuit connected to the high voltage line;
    a variable resistor, connected to the recharging circuit, for varying a resistance thereof;
    a device identifying unit, connected to the variable resistor, for identifying a type of connected device; and
    a voltage detecting unit, connected between the recharging circuit and the device identifying unit, for detecting a voltage of power flowing in the high voltage line.

17. The electronic device of claim 16, further comprising:
    a resister adjusting unit for adjusting the variable resistor.

18. The electronic device of claim 16, further comprising:
    a power supply unit connected to the recharging circuit,
    wherein the recharging circuit is connected to the variable resistor and serves as a current mirror.

19. The electronic device of claim 13, wherein the connected device identifying unit linearly increases the current.

20. The electronic device of claim 19, wherein the connected device identifying unit compares a voltage at a time point when the voltage is dropped according to the increment of current with reference data and determines a type of connected device.

* * * * *